Oct. 14, 1952     L. E. BRUNS ET AL     2,613,591
BALE LOADING ATTACHMENT FOR BALERS
Filed Aug. 5, 1948     2 SHEETS—SHEET 1

Inventors
Louis E. Bruns,
Theodore M. Bruns
By Harold Kilgore
ATTORNEY

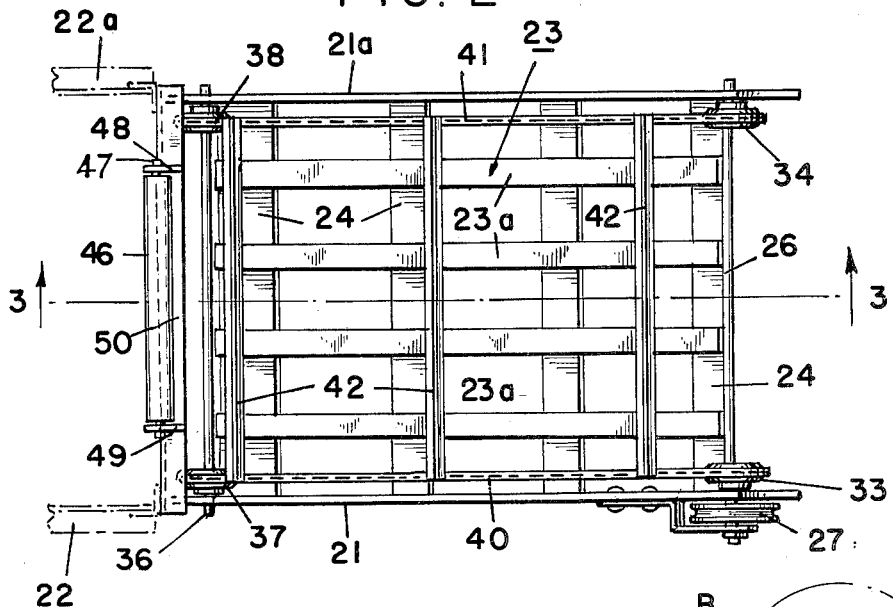
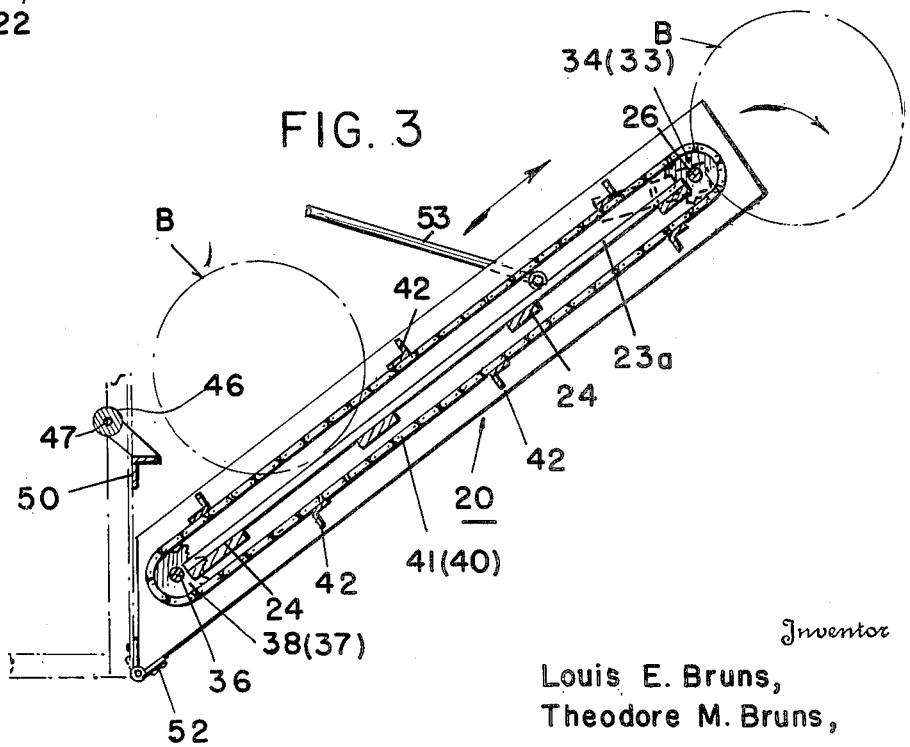

Patented Oct. 14, 1952

2,613,591

UNITED STATES PATENT OFFICE 2,613,591

BALE LOADING ATTACHMENT FOR BALERS

Louis E. Bruns and Theodore M. Bruns,
Hecla, S. Dak.

Application August 5, 1948, Serial No. 42,704

2 Claims. (Cl. 100—88)

1

This invention relates to improvements in bale loading attachments for balers, and more particularly to a bale holding and elevating attachment for rotary balers by which the bales discharging from the baler may be loaded directly on to a transport vehicle.

As is well known, rotary balers of the type disclosed in the Luebben Patents Nos. 2,096,990 and 2,336,491 and Harrer No. 2,424,821 operate to roll a bat of hay or like fibrous material delivered thereto into a cylindrical bale which is then tied with twine and usually discharged onto the ground. To a large extent, the discharged bales were picked up and loaded by hand on a pick-up wagon or truck by which they were transported to a place of storage or use. Where mechanical bale loaders were employed, such took the form of equipment separate and distinct from the baler which was usually driven and moved about under its own power. Obviously, hand loading of the bales as aforesaid is a laborious and time-consuming operation, whereas the operation and maintenance of a mechanical loader represents a substantial item of cost.

The present invention aims to provide a simple yet effective attachment for rotary balers which catches or receives the bales as they are discharged from the baler and thereupon elevates them to a level above that of the floor or bottom of a transport vehicle on to which they may be rolled for stacking thereon. In such an attachment, the bale elevating means may be and preferably is driven from the baler and, being attached to the baler, can be moved about with the baler. Thus, a bale loading attachment of the invention eliminates the hand labor incident to picking up bales from the ground and loading them on to a transport vehicle, as well as any requirement for a separate piece of loading equipment where such is employed in place of the hand loading practice.

In a bale loading attachment as proposed, the bales discharging from the baler fall on to the lower end of the elevating means which is vertically inclined. By virtue of their cylindrical shape, the bales may roll back into the moving parts of the baler. To prevent same, the invention contemplates the provision of bale holding means operative between baler and elevating means both to direct and guide the discharging bales on to the elevating means and to hold the bales against return or back movement to the baler until they begin their elevating movement.

A bale loading attachment for rotary balers which is designed to be both supported and driven

2 from the baler, as herein proposed, achieves numerous practical advantages. Thus the loading attachment of the present invention may not only be moved about with the rotary baler as an operating part thereof, but may be driven from the baler by a simple power take-off. Moreover, where the baler and attached loading means is drawn by a tractor, the bale transport vehicle may be coupled to the baler so as to be also drawn by the tractor, and in position to directly trail the loading means, with the result that the operations of baling and loading can be carried on in a straight-line flow operation.

The above and other objects and features of advantage of the bale loading attachment for rotary balers according to the invention will be apparent from the following detailed description, taken with the accompanying drawings illustrating a preferred physical embodiment thereof, in which—

Fig. 2 is a top plan view of the bale loading attachment as aforesaid; and

Fig. 3 is a section taken along line 3—3 of Fig. 2.

Figure 1:
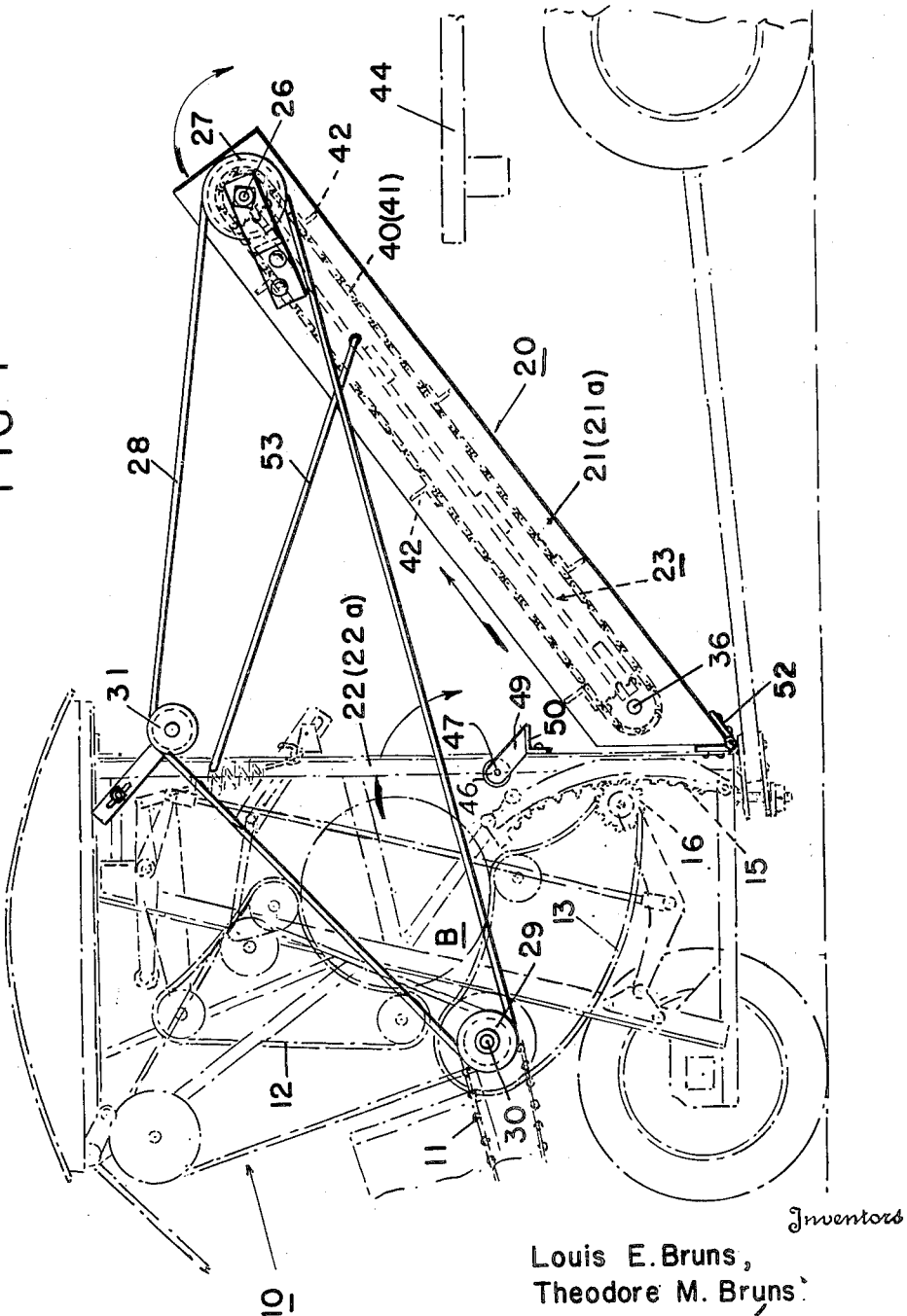
Fig. 1 is a side elevation of the bale loading means of the invention shown as attached to a rotary baler and delivering to a trailing transport vehicle which is more or less diagrammatically illustrated.

In the drawings, wherein like reference characters designate like parts throughout the several views, reference character 10 (Fig. 1) generally indicates a rotary baler of the type shown in the Luebben and Harrer patents aforesaid, wherein a bat of hay is fed by a conveyor 11 to a pocket provided between two vertically related endless bands 12, 13 functioning to roll the bat to cylindrical or roll formation. In Fig. 1, the bale which is indicated at B is illustratively shown to have been rolled to its final diameter, and the rearward bights or loops of the endless band to have spread apart, consequent to the upper band 12 raising and the lower band 13 lowering from their pocket-forming relation, with the result that the bale is free to discharge by gravity, usually on the ground. As is well understood, the lowering path of the rearward loop of the lower endless band 13 is defined by arcuate rack bars 15, one on each side of the baler, on which toothed pinions 16 track, the pinions being fast on the shaft which carries the lower tension roller over which the loop travels. Unless the formed bales are permitted to discharge on to the ground, it will be observed that provision must be made for preventing the bales from rolling back, due to their cylindrical formation, into the moving parts of the baler and possibly interfering with the proper functioning thereof.

As distinguished from the practice heretofore of permitting the bales to discharge on the ground, from which they were picked up and loaded manually, or by a separate piece of loading equipment, the present invention provides an attachment for a baler as aforesaid, which is direct-coupled thereto and operates to receive the discharging bales, to hold them against rolling back into the baler, and thereupon to elevate them to a level such that they can be dropped on to a trailing transport vehicle, such as a truck or wagon.

First considering the bale elevating means generally designated by the reference character 20, such may include an upwardly inclined frame structure of channel-section formed by upright side frame members 21, 21a which are spaced approximately the distance of the side frames 22, 22a of the baler, and which support a similarly inclined floor or bottom member 23. Said bottom member may be fabricated as shown in Fig. 2 from a plurality of laterally spaced slats 23a secured to the side frame members 21, 21a by transverse supporting members 24.

The upper end of the frame structure supports a cross shaft 26 which is powered to turn in clockwise direction as by means of a pulley 27 fast on one extended end thereof. The pulley carries one end loop of an endless driving belt 28 (Fig. 1), the other end loop thereof extending to and being trained over a pulley 29 fast on the shaft 30 which drives the bale forming bands 12, 13 of the baler. The upper flight of the driving belt may be trained over an idling pulley 31 mounted from one rear side frame 22 of the baler, the position of the pulley 31 being adjustable so as to take up slack in said belt. Keyed or otherwise connected to the powered upper cross shaft 26 are chain spockets 33, 34 which are disposed just inwardly of the side frame members 21, 21a.

Journaled for free rotation in the lower end of the frame structure is a lower cross shaft 36 carrying suitable sprockets 37, 38 which are aligned with the upper sprockets 33, 34. And trained over the aligned sprockets so as to be driven by the upper sprockets are two chains 40, 41 which are spaced in lateral direction approximately the width of the channeled frame structure, and which carry a plurality of transversely extending push bars 42 spaced from one another in the direction of chain travel an amount which is somewhat greater than the diameter of the cylindrical bales. As seen in Fig. 3, the push bars 42 may consist of angle irons, one flange of which is fixed to the corresponding links of the spaced chains 40, 41, the other flange extending vertically upward from the upper flight of the chain.

By reference to Fig. 3, it will be observed that the diameter of the chain sprockets is sufficiently large as to dispose the upper flights of the chains 40, 41 an appreciable distance above the upper surface of the bottom 23 of the channel-shaped frame structure 20, and also that said upper surface is substantially flush with the upper peripheral portions of the cross shafts, so that the upper cross shaft 26 in particular provides no obstruction to the flow of bales propelled upwardly along the bottom of the channel frame structure.

With the construction so far described, it will be seen that bales discharging from the baler fall by gravity onto the lower end of the bottom 23 of the inclined conveyor frame, which thus functions as a receiving surface for the bales. Thereupon, as the upper flights of the chains move upwardly and in a plane above that of the upper surface of the frame bottom 23, and with the push bars 42 spaced a still further amount above said surface, said push bars engage the bales and propel them in an upward direction along the bottom 23 of the channeled frame structure on which the bales are primarily supported. Upon the bales reaching the top edge of the frame bottom, they roll over the same and may drop on to a transport vehicle generally indicated at 44, Fig. 1.

To prevent the bales discharging onto the lower end of the bottom of the channeled frame structure as aforesaid from rolling back into the baler, and possibly interfering with the proper functioning of the moving parts thereof, the invention provides simple yet effective means for holding the bales received on the bottom 23 thereof until they are engaged by the oncoming pusher bars 42. As seen in Figs. 2 and 3, such holding means may comprise a transversely arranged roller 46 which is mounted for free rotation on an axle or shaft 47 secured at its ends in brackets 48, 49, carried by a transverse angle-iron supporting member 50 extending between and fixed to the side frames 22, 22a, of the baler.

The bale holding roller 46 is arranged above the lower end of the elevating means and at a level such that its upper surface is at the approximate level of the upper surface of the lower band or belt 13 of the aforesaid ball-rolling belts, when said lower belt is in its lowered or bale-discharging position. Thus the roller 46 directs and guides the discharging bales onto the elevating means, the free mounting of the roller facilitating movement of the bales onto the elevator. More important, the roller is positioned to obstruct return movement of the bales to the baler from which they have been discharged. In other words, and as seen in Fig. 3 illustrating the action of the holding means on a bale B, the holding roller is disposed to the rear of a bale supported on the bottom of the frame structure so that it holds the bale from rolling rearwardly until it is positively engaged by an oncoming push bar 42 which propels it in upward direction along said bottom and eventually discharges it over the top edge of the elevator frame structure and on to the transport vehicle 44.

Although the elevating means as described may be direct-coupled to the baler in numerous ways, it is shown to be hingedly connected at its lower end thereto by means of a hinge 52 and at its upper end by support bars 53 extending to the baler side frames. If desired, the support bars 53 may incorporate a turnbuckle or similar length-adjusting means whereby the inclination of the elevating means may be varied as required.

Without further analysis, it will be appreciated that the bale loading attachment for balers according to the invention provides a valuable adjunct for a known type of baler normally discharging bales on to the ground. When attached to the baler as herein proposed, the described bale loading means receives the bales as they are discharged from the baler and elevates them so that they may be delivered directly to a transport vehicle rather than being picked up and loaded manually, or by separate bale loading apparatus. By connecting the transport vehicle to the baler through a suitable hitch, so that it trails the loading mechanism, the operations of baling and loading can be carried out in a continuous, single flow operation.

As many changes could be made in carrying out the above constructions without departing from the scope of the invention, it is intended that all matter contained in the above description or shown in the accompanying drawings shall be interpreted as illustrative and not in a limiting sense.

We claim:

1. In combination with a baler having upper and lower belt means adapted to form material into a cylindrical bale and being movable to a bale discharge position for effecting discharge of the formed bale in downward direction, bale-elevating means directly coupled at its lower end to the baler in position to receive the bales discharging from the baler and being operative to elevate said bales in an upwardly inclined path, and a bale-engaging roller mounted on the baler frame having its bale-engaging surface substantially at the level of the upper surface of the lower belt means in its discharge position, said roller being operative both to guide and direct the discharging bales to the elevating means and to block return movement of a bale positioned on the lower end of said elevating means to said baler.

2. In combination with a baler having upper and lower belt means adapted to form material into a cylindrical bale and being movable to a bale-discharging position for effecting discharge of the formed bales in downward direction, upwardly inclined bale-elevating means directly coupled at its lower end to the baler in position to receive the bales discharging from the baler, said elevating means comprising an upwardly inclined bale receiving and supporting surface and spaced bale-pushing means movable upwardly along the supporting surface, and a bale-engaging roller extending transversely between the rear frame members of the baler and having its bale-engaging surface substantially at the level of the upper surface of the lower belt means in its discharge position, said roller being operative to guide and direct the discharging bales on to the supporting surface of the elevating means and to block return movement to the baler of a bale positioned on the lower end of said supporting surface prior to said bale being engaged by a bale-pushing means.

LOUIS E. BRUNS.
THEODORE M. BRUNS.

REFERENCES CITED

The following references are of record in the file of this patent:

UNITED STATES PATENTS

| Number | Name | Date |
|---|---|---|
| 703,470 | Rembert | July 1, 1902 |
| 862,105 | Reagan | July 30, 1907 |
| 1,312,304 | Burgess | Aug. 5, 1919 |
| 1,857,373 | Goggins | May 10, 1932 |
| 1,863,648 | Bernard | June 21, 1932 |
| 2,316,435 | James | Apr. 13, 1943 |
| 2,335,924 | Elholm | Dec. 7, 1943 |
| 2,364,282 | Fees | Dec. 5, 1944 |
| 2,424,292 | Watkins et al. | July 22, 1947 |
| 2,468,641 | Scranton et al. | Apr. 26, 1949 |

FOREIGN PATENTS

| Number | Country | Date |
|---|---|---|
| 606,825 | Germany | Dec. 11, 1934 |